Aug. 29, 1950  G. S. BOONE  2,520,196
TRANSFERRING DEVICE
Filed Aug. 6, 1948  2 Sheets-Sheet 1
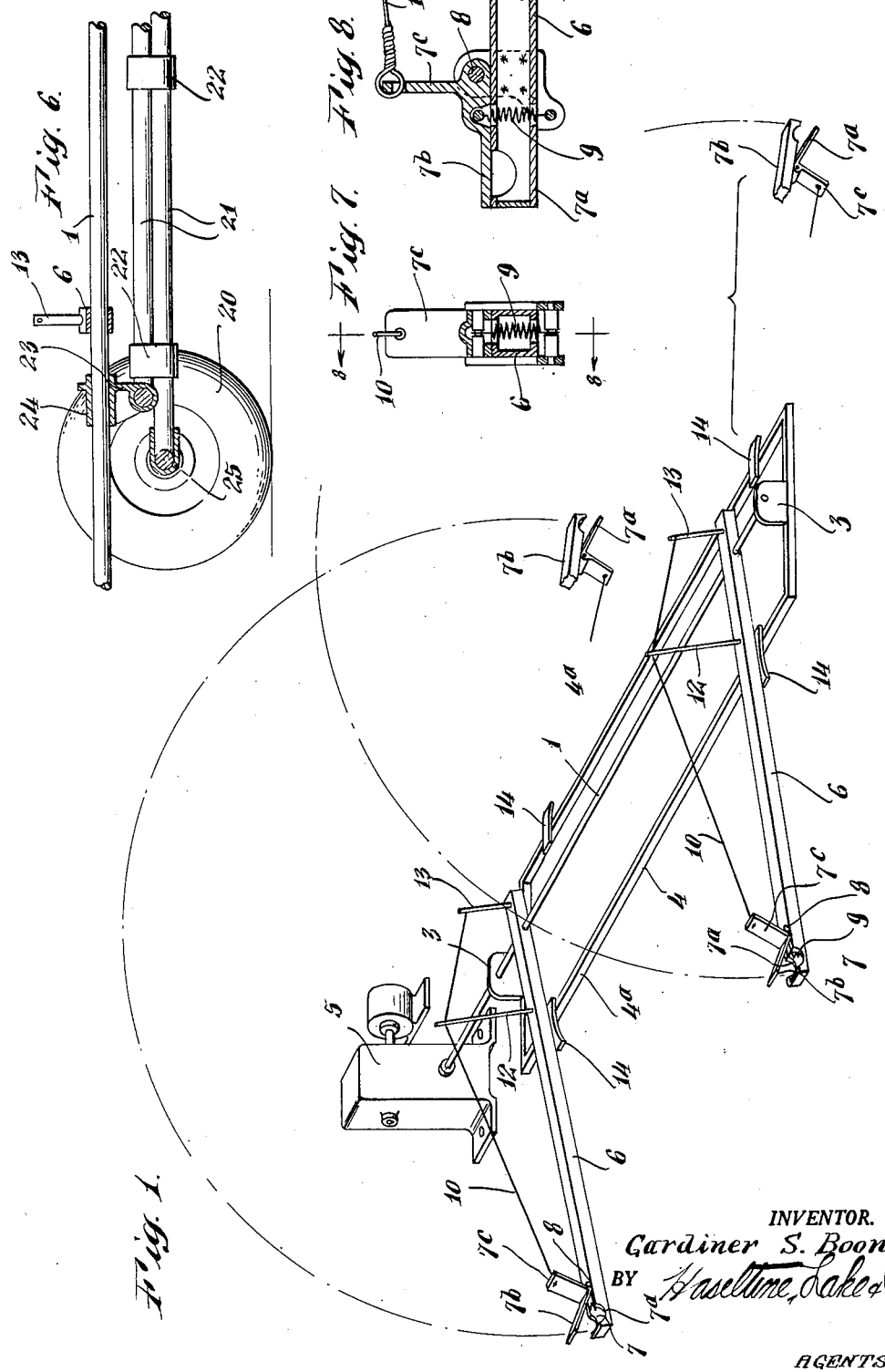
INVENTOR.
Gardiner S. Boone
BY Haseltine, Lake & Co.
AGENTS.

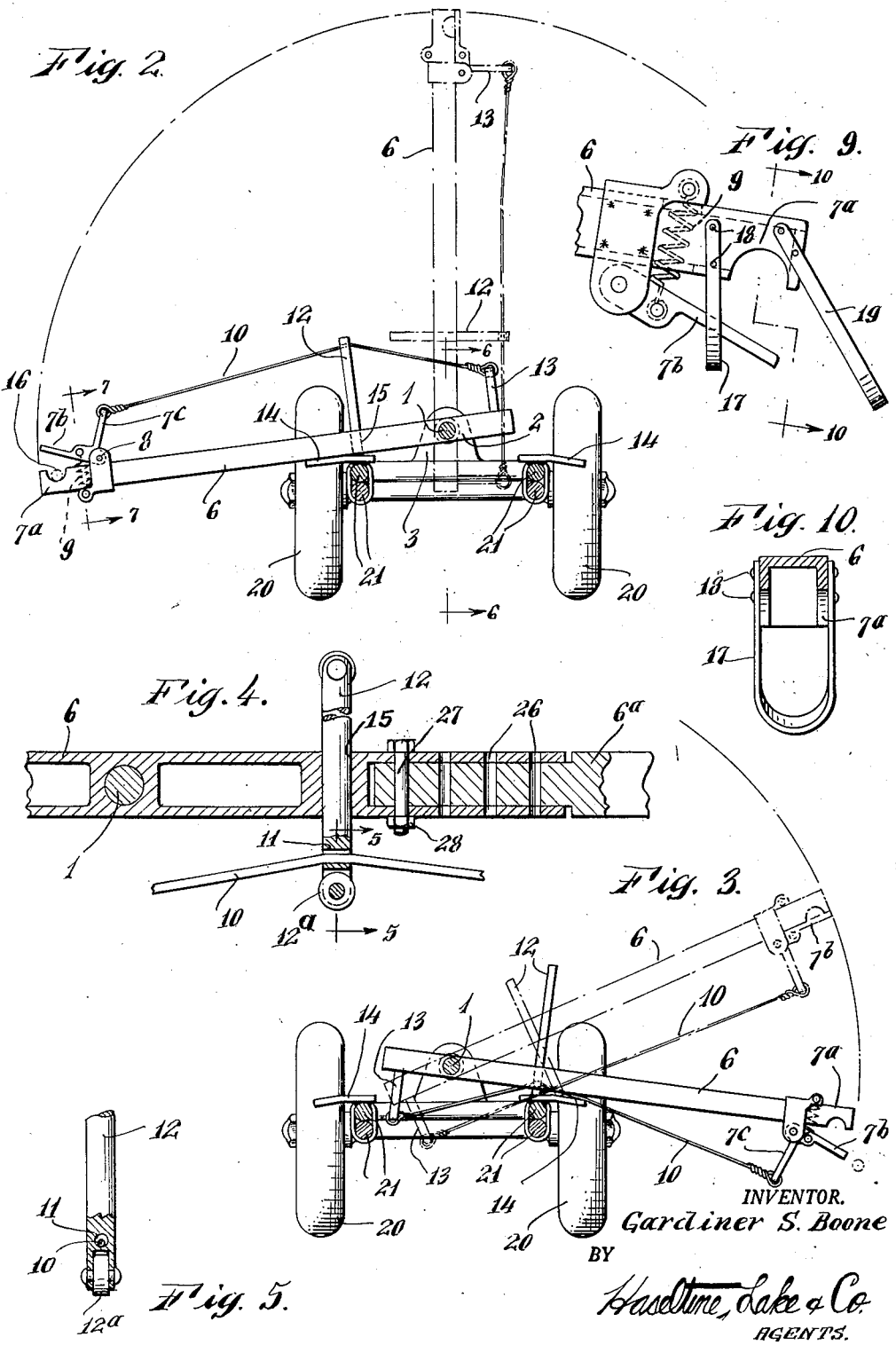

UNITED STATES PATENT OFFICE 2,520,196

TRANSFERRING DEVICE

Gardiner S. Boone, Smithtown Branch, N. Y.

Application August 6, 1948, Serial No. 42,799

2 Claims. (Cl. 214—1)

This invention relates to apparatus for moving elongated articles such for example as sections of pipe from one location to another and has particular but not exclusive reference to an apparatus for transferring lengths of irrigation pipe from one location to another. At present it is the usual practice in irrigating fields of growing crops such as vegetable plants and roots e. g. potatoes, to lay the sections of irrigation pipe between the rows of growing crops by manual labor, the work of moving a section of pipe from one location over the rows of crops across soft cultivated ground being a laborious one entailing the employment of at least two men for each section and occupying considerable time which makes the work of irrigating a large field a tedious, difficult and expensive one.

It is accordingly the principal object of this invention to provide apparatus by which such elongated articles as sections of irrigation pipe may be easily moved from one location to another.

It is a further object of the invention to provide power driven apparatus by which the elongated article may be moved in an arcuate path from one location and discharged at another desired location.

It is a further object of the invention to provide apparatus having jaws to receive the article to be transferred the said jaws being automatically closed upon commencement of movement about an arcuate path and automatically opened to discharge the article upon completion of said arcuate movement.

A further object of the invention is to provide apparatus comprising at least one beam, a rotatable shaft to which said beam is secured a reversible power means for rotating said shaft and a jaw member on one extremity of said beam for receiving the article to be transferred. Preferably two or more of said beams each having jaws at their extremities are provided.

Other objects of this invention will be apparent from the following description with reference to the accompanying drawings.

Referring to the drawings which by way of illustrative example show the apparatus of my invention adapted for the transfer of elongated rods or pipes, such as irrigation pipe, Figure 1 is a perspective view.

Figure 2 an end view showing the apparatus mounted upon a wheeled truck or chassis.

Figure 3 is a similar view but showing the transferring beams at different stages of their translational movement.

Figure 4 is a detail on an enlarged scale showing a modified beam construction.

Figure 5 is a detail partly in section taken on the line 5—5 of Figure 4 of a pin member adapted to control the opening and closing of the jaws as will hereinafter be explained.

Figure 6 is a view taken on the line 6—6 of Figure 2.

Figure 7 is a section on the line 7—7 of Figure 2.

Figure 8 is a section on the line 8—8 of Figure 7.

Figure 9 is a detail view showing the jaw mechanism with a member guiding the discharge of the articles which may optionally be employed; and, Figure 10 is a section taken on the line 10—10 of Figure 9.

In the drawing 1 represents a rotatable shaft mounted in bearings 2 in brackets 3 on a rectangular frame 4. The shaft 1 may be driven from any suitable source of power such as a reversible electric motor, a double acting pneumatic pump, the motion of an automobile on which the apparatus may be mounted or any other convenient or suitable manner. In the drawings a unit 5 is diagrammatically shown to indicate the power source which will be provided with any suitable known reversing mechanism and gearing (not shown) for transmitting rotary motion to said shaft 1. Secured to and transversely of the shaft 1 so as to rotate therewith is one or more beams 6. Two such beams 6 have been illustrated but it will be understood that any desired number may be employed dependent upon the type of article to be moved by the apparatus. Upon one extremity of each beam is a jaw 7 having a fixed jaw member 7a and a movable jaw member 7b the latter being pivoted at 8 a tension spring 9 tending to maintain the movable jaw member 7b in closed position. The movable jaw member forms one branch of a bell-crank lever of which the other branch 7c is connected to a wire or cable 10 which passes through an orifice 11 (Figs. 4 and 5) in the upper portion of a pin or post 12 and is secured at its opposite end to a pin or post 13 which is fixedly attached to the beam 6 near the end thereof opposite to the jaw 7. The lower end of the post 12 is slidable in an orifice 15 extending through the beam 6. Secured to each of the longitudinal members 4a of the frame 4 at diametrically opposite points are cam members 14. A roller 12a (Figure 4) is preferably mounted on each extremity of the post 12. In the position of the parts shown in full lines in Figures 1 and 2 the lower end of the post 12 is in contact with the cam member 14 and is held by the latter in its uppermost position thereby tensioning the wire or cable 10 and holding the movable jaw 7b open against the pull of the spring 9. When the shaft 1 is rotated in a clockwise direction as seen in Figures 1 and 2 it carries the beam 6 upwardly in an arcuate path. As soon as the beam is moved upwardly the lower end of the post 12 is free to move downwardly in the orifice 15 in the beam thereby causing the wire or cable 10 to slacken and permitting the jaw member 7b to be closed by the spring 9, thereby retaining in the jaw the pipe or rod 16 which is to be transferred. As the shaft 1 continues to rotate it carries the beam successively into the positions shown in dotted lines in Figures 2 and 3 the wire or cable remaining sufficiently slack to enable the spring 9 to keep the jaw closed. It will be noted that as the beam reaches the position shown in dotted lines in Figure 3 the post 12 contacts the cam member 14 on the opposite side of the frame and as the beam continues its arcuate movement the post is forced through the orifice 15 in the beam and again pulls the wire or cable 10 taut so that at or near the end of the arcuate movement the jaw member 7b is opened against the pull of spring 9 to release the rod or pipe. Preferably, as shown in Figs. 9 and 10 I provide a loop or stirrup member 17 secured to the fixed jaw member 7a as by rivets 18 which stirrup member serves to guide the pipe or tube as it is being discharged. A second stirrup member 19 may be provided if desired.

It will be understood that upon reverse rotation (in an anticlockwise direction) of the shaft 1, the sequence of operations is repeated, namely the beam is lifted, the post 12 relieved from pressure and permitted to move through the orifice 15 in the beam to slacken the wire or cable 10 thereby causing the jaw to close until the post 12 comes into contact with the cam member 14 on the opposite side of frame 4 when it will be forced into its uppermost position to again pull the wire or cable taut to open the jaw for reception of another length of pipe.

The beam 6 may be of any suitable material, wood, steel or a metal alloy providing adequate strength with lightness. It may be of any cross section desired and preferably is hollow. To provide for adjustment of the length of the beam it may be made in two or more parts telescopically connected and secured together by removable bolts 27 and nuts 28 or their equivalent as shown in Figure 4 by way of example, the bolts passing through alined orifices 26 in the parts 6 and 6a of the beam.

As above stated the apparatus above described may be carried on the floor of a wagon or truck but preferably is supported on wheels 20 as illustrated by way of example in Figures 2, 3 and 6. In these figures the frame comprises longitudinal members 21 held together by collars 22 one of said members being secured to a bracket 23 carried by a sleeve 24 from the shaft 1 and the other of said members 21 being secured as at 25 to the wheel axle.

What I claim is:

1. Apparatus for transferring articles from one location to another comprising a rotatable shaft, at least one beam secured to said shaft with its axis tranverse to the axis of the shaft so as to be moved in an arcuate path when said shaft rotates, means to rotate said shaft, a jaw on one extremity of said beam, said jaw comprising a movable jaw member and a fixed jaw member, a spring tending to maintain said movable jaw member in closed position, a wire or cable secured at one end to said movable jaw member, a pin secured to the beam near the extremity opposite to the jaw, the other end of said wire or cable being secured to said pin, a frame, stationary cam members carried by said frame and means located intermediate said jaw and said pin for cooperating with said cam members to tighten said wire or cable and open the movable jaw member against the action of said spring at predetermined positions of said beam.

2. Apparatus as claimed in claim 1 wherein said intermediate means comprises a post slidable vertically in an apertured portion of said beam and having one end engaging said wire or cable, the other end of said post contacting one of said cam members as the beam is moved in its arcuate path of travel and is moved thereby to stretch said wire or cable and causes it to open the movable jaw, the arrangement being such that when the said post is out of contact with either of said cam members it can slide in said apertured portion and permit the wire or cable to slacken and thus enable the said spring to close the movable jaw member.

GARDINER SMITH BOONE.

REFERENCES CITED

The following references are of record in the file of this patent:

UNITED STATES PATENTS

| Number | Name | Date |
|---|---|---|
| 1,858,642 | Ross | May 17, 1932 |
| 1,909,813 | Crosbie | May 16, 1933 |
| 2,275,561 | Sahlin | Mar. 10, 1942 |
| 2,445,076 | Munson | July 13, 1948 |